Sept. 13, 1966  F. K. LACHER  3,271,819
EXTRUDER
Filed Feb. 26, 1962
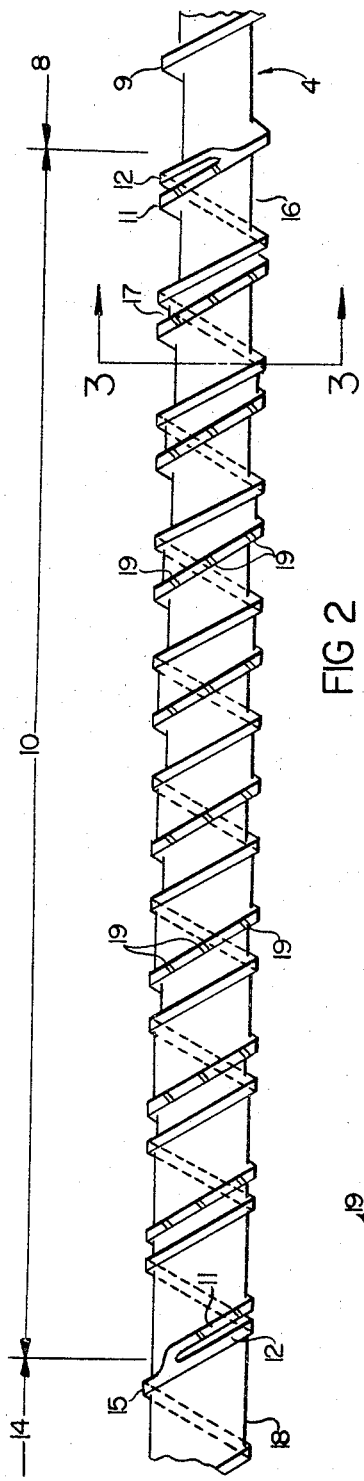
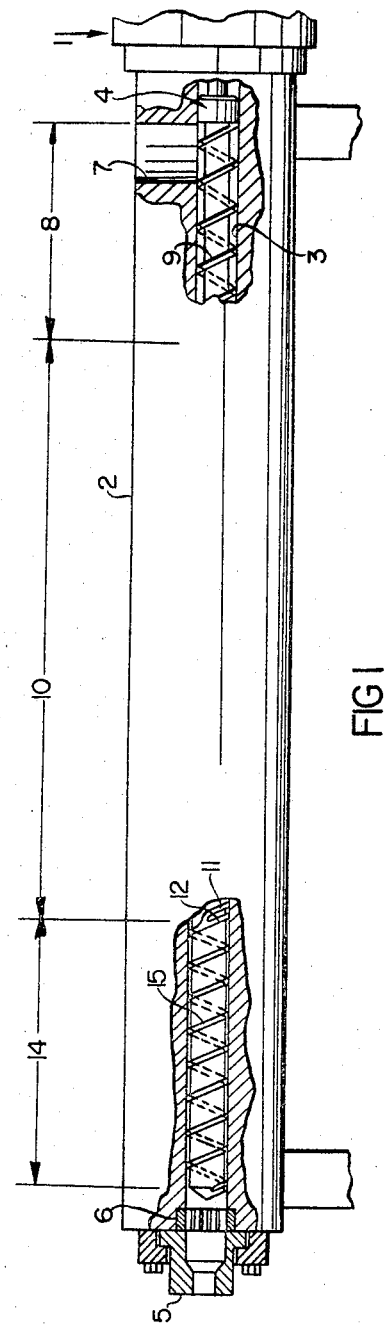
INVENTOR.
FREDERICK K. LACHER
BY
Oberlin, Maky & Donnelly
ATTORNEYS United States Patent Office 3,271,819
Patented Sept. 13, 1966

3,271,819
EXTRUDER
Frederick K. Lacher, Akron, Ohio, assignor to
NRM Corporation, a corporation of Ohio
Filed Feb. 26, 1962, Ser. No. 175,754
3 Claims. (Cl. 18—12)

The present invention relates generally as indicated to an extruder and more particularly to improvements in the feed screw thereof.

It is, of course, known in the art to provide various forms of feed screws in extruders according to the type of plastic material which is being worked. For example, in so-called metering type feed screws there is generally provided a feed section of constant channel depth and either constant or varying pitch of the flight, a transition section of decreasing channel depth, and a metering section of minimum channel depth, and in some cases the metering section may be a smooth torpedo, or it may be provided with mixing flights.

The present invention is principally concerned with improvements in the transition section of a feed screw which is disposed between the aforesaid feed and metering sections.

Accordingly, it is a principal object of this invention to provide an extruder and feed screw therefor in which the latter, between its ends, has an intermediate transition section including axially overlapping feed and metering portions having restricted communication with each other to provide for increased back pressure and consequent intensified working, heating, and bulk reduction of the material in the feed portion of the transition section, to provide for restricted flow of refined material and consequent thorough mixing and blending of the plasticized material as it flows from the feed portion to the metering portion, and to provide for gradual plasticization and uniform flow of the material from the metering portion to the metering section of the feed screw.

It is another object of this invention to provide an extruder and feed screw therefor wherein the aforesaid transition section includes two merging flights of different pitches having a restrictor communicating one helical channel with the other effective to build up pressure in said one channel and to prevent flow of unrefined material from said one channel into the other.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a side elevation view of an extruder according to the present invention, said view being partly in cross-section at its ends showing the feed opening at one end of the cylinder and the feed section of the feed screw and showing the extrusion die at the other end and the adjacent metering section of the feed screw;

FIG. 2 is an elevation view on enlarged scale showing the intermediate transition section of the feed screw which is disposed between the aforesaid feed and metering sections; and FIG. 3 is a transverse cross-section view taken substantially along the line 3—3, FIG. 2.

Referring now more particularly to the drawing, and first to FIG. 1, the extruder 1 comprises a cylinder assembly 2 having a longitudinal bore 3 therethrough in which the feed screw 4 is turned by connection of a power drive means (not shown) to the right hand end thereof.

Mounted on the discharge end of the cylinder 2 may be the usual extrusion die 5 and breaker plate and screen assembly 6. At the other end of the cylinder 2 is a feed opening 7 for solid material (pellets, granules, chips, etc.) which intersects the cylinder bore 3.

The feed screw 4 herein may be divided into three sections, namely, the feed section 8 which is herein shown as a flight 9 which for four turns is of constant pitch and which for about one and one-half turns is of greater pitch and of gradually decreasing channel depth; a transition section 10 which comprises merging flights 11 and 12 of different constant pitches with gradually decreasing channel depths, and a metering section 14 which may comprise, for example, a constant pitch flight 15 extending for seven or more turns and having a constant relatively shallow channel depth.

As an example, for a 2½″ diameter feed screw of about 59″ length, the feed section 8 would be about 15″ long including four turns of a 2½″ pitch flight 9 with a channel depth of about ½″, and the balance of flight 9 to the point of divergence of flights 11 and 12 may be of 3″ pitch and of gradually decreasing channel depth. The metering section 14 on the other hand, comprises a flight 15 of 2½″ pitch for a length of about 16″ and a constant channel depth of about ⅛″ for a length of about 12½″ from the tip of the feed screw 4.

The intermediate transition section 10, in the example given, is of about 28″ length, that is, about one-half the effective length of the feed screw 4, and comprises two merging flights 11 and 12 of different pitches. One flight 11 is a continuation of the feeding flight 9 and may have a 3″ pitch for about ten turns, whereas, the other flight 12 which joins the metering section flight 15, has a pitch of about 2.8″ for ten turns.

Adjacent the feed section 8 these two flights 11 and 12 are merged together and gradually diverge from each other by reason of the different pitches so that the helical channel 16 which is a continuation of the feed section 8 becomes of progressively decreasing axial width whereas, the other helical channel 17 starts from zero adjacent the feed section 8 and becomes progressively axially wider to smoothly join the helical channel 18 at the beginning of the metering section 14. In the specific example given, the hub of the feed screw 4 is tapered so as to gradually decrease the depth of channel 16 from about ½″ to about .18″ as the material flows from the end of the 2½″ pitch portion of flight 9 through the transition section 10 to the point of convergence of the flights 11 and 12. The other channel 17 starts out at zero axial width and widens progressively to where it continues as flight 15 and starts out at about ¼″ depth and decreases gradually in depth to about ⅛″ after about one and one-half turns of flight 15. The remaining portion of channel 18 may be of constant ⅛″ depth.

The transition section 10 provides a restriction against the flow of large particles of unplasticized material from the channel 16 to the channel 17 and in the present example, the restriction constitutes a series of small grooves 19 across the periphery of the flight 11 and thus back pressure is built up in the material that is being worked, heated, and compressed in the channel 16 for flow into the other channel 17. At the same time, the restriction thus formed by the grooves 19 holds back large particles of material and thus assures that these particles and contaminants do not reach the channel 17 in the transition section 10 and the channel 18 of the metering section. By way of example, when the crest width of flight 11 is ⁵⁄₃₂″ and has a radial clearance of .001 to .003″ with bore 3, the grooves 19 can be spaced about 45° apart and be of about 1/16″ width and depth to extend diagonally across the crest as shown.

Of course, final screening or straining of the material is effected by the breaker plate assembly 6 which is located just in advance of the extrusion die 5. The assembly 6, as well known, also serves to build up required back pressure in the metering section channel 18 and in the transition section channel 17. The largest pressure drop is across the restrictor between the transition section channels 16 and 17.

Other modes of applying the principle of the invention may be employed, change being made as regards the details described, provided the features stated in any of the following claims or the equivalent of such be employed.

I, therefore, particularly point out and distinctly claim as my invention:

1. An extruder comprising a cylinder having an inlet for introduction of plastic and like material; a feed screw rotatable in said cylinder having a helical flight effective, upon rotation of said feed screw, to advance material through said cylinder for plasticizing during the course of its flow; said feed screw having successive feed, transition, and metering sections in the direction of advance of the material; said flight, in said feed and transition sections, defining a first helical channel through which material is advanced from said feed section into said transition section and, in said transition and metering sections, defining a second helical channel through which material is advanced from said transition section through said metering section; said channels having restricted communication with each other in said transition section for buildup of pressure in said first channel and for flow of refined material from said first channel into said second channel; said first channel being of progressively decreasing axial width and progressively decreasing radial depth in said transition section; and said second channel being of progressively increasing axial width and progressively decreasing radial depth in said transition section.

2. The extruder of claim 1 wherein the portion of said first channel in said transition section progressively decreases to about one-third of its original radial depth; and wherein the portion of said second channel in said transition section progressively decreases to about one-half of its original depth, the original depth of said second channel being about one-half the original radial depth of said first channel.

3. The extruder of claim 2 wherein said first and second channels are of different pitch in said transition section to provide such progressively decreasing and increasing axial width of said first and second channels respectively in said transition section.

References Cited by the Examiner
UNITED STATES PATENTS 2,343,529  3/1944  Brown _____ 18—12
2,680,879  6/1954  Schnuck et al. _____ 18—12

FOREIGN PATENTS 76,225  10/1954  Holland.

WILLIAM J. STEPHENSON, *Primary Examiner.*

MICHAEL V. BRINDISI, J. SPENCER OVERHOLSER,
*Examiners.*

W. L. McBAY, L. S. SQUIRES, *Assistant Examiners.*